United States Patent [19]

Fodale et al.

[11] Patent Number: 5,400,762
[45] Date of Patent: Mar. 28, 1995

[54] METHOD FOR DETERMINING FUEL COMPOSITION

[75] Inventors: Francis M. Fodale, Beverly Hills; Robert J. Nankee, II, Canton; William D. Rotramel, Plymouth; Mary Joyce, West Bloomfield; Stuart M. Davis, Birmingham, all of Mich.

[73] Assignee: Chrysler Corporation, Highland Park, Mich.

[21] Appl. No.: 933,552

[22] Filed: Aug. 24, 1992

[51] Int. Cl.6 .................... F02D 41/14; F02D 41/22
[52] U.S. Cl. .................................... 123/674; 123/690
[58] Field of Search .............. 123/690, 479, 1 A, 575, 123/674, 350, 351, 520

[56] References Cited

U.S. PATENT DOCUMENTS

| 4,615,316 | 10/1986 | Yasuhara | 123/351 |
| 4,977,881 | 12/1990 | Abe et al. | 123/520 |
| 4,986,241 | 1/1991 | Inoue et al. | 123/690 |

*Primary Examiner*—Andrew M. Dolinar
*Attorney, Agent, or Firm*—Beverly M. Bunting; Mark P. Calcaterra

[57] ABSTRACT

A method is provided for checking the function of a fuel composition sensor and for learning the percent alcohol content of a fuel used in a motor vehicle capable of operating on more than one type of fuel, as an alternative to a fuel composition sensor. The present invention improves the reliability of a motor vehicle utilizing a fuel composition sensor by allowing vehicle operation to continue uninterrupted, such as when a short or open condition exists within the sensor. The method first determines whether conditions are such that the percent alcohol content of a fuel should be "learned". If conditions are appropriated, then necessary engine operating conditions are first initialized. The oxygen sensor output signal is checked to determine whether the engine is operating too rich or lean. The value of percent alcohol content stored in the engine control unit's memory is modified in the direction of stoichiometric engine operation. In this manner, the engine is able to "learn" the percent alcohol content of the fuel and make the appropriate adjustments to operating parameters.

5 Claims, 1 Drawing Sheet

METHOD FOR DETERMINING FUEL COMPOSITION

FIELD OF THE INVENTION

The present invention relates generally to fuel composition for a motor vehicle, and more particularly to a method for determining the percent alcohol content of a fuel used in a motor vehicle capable of operating on more than one type of fuel.

DESCRIPTION OF THE RELATED ART

Environmental and energy independence concerns have stimulated the development of alternative transportation fuels, such as alcohol fuels, for use in automobiles. Alcohol fuels include methanol and ethanol. A flexible fuel vehicle capable of operating on gasoline, or alcohol fuel, or any mixture of the two fuels, is therefore in demand. Modifications to the engine are necessary when operating on different fuels, because of the different characteristics of each fuel. For example, an engine operating on methanol or M85 (a blend of 85% methanol and 15% gasoline) requires approximately 1.8 times the amount of fuel relative to gasoline at stoichiometry due to a lower energy content of the methanol.

For example, U.S. Pat. No. 5,119,671, "Method for Flexible Fuel Control," hereby expressly incorporated by reference, discloses a fuel composition sensor that measures the percent alcohol content of the fuel and relays that information to an engine controller or the like so that dependant variables such as spark timing and air/fuel ratio can be adjusted accordingly.

Commonly assigned application, U.S. Ser. No. 07/933,551, filed on the same day as the subject application entitled "Method For Determining Fuel Composition Using Oxygen Sensor Feedback Control" provides a method for determining the percent alcohol content of the fuel in the fuel tank utilizing the oxygen sensor feedback control loop to sense changes in air/fuel ratio and relay that information to the engine controller so that dependant variables can be adjusted accordingly. The fuel pump is located in the tank along with a fuel accumulator so that a known composition of fuel and slowly varying percentage of alcohol in the fuel is provided to the engine, especially critical during open loop operation.

In a typical automotive engine, a microprocessor, contained in an engine control unit (ECU), receives inputs from a number of sensors, processes the information from the sensors, and sends out instructions to selectively adjust various parameters such as spark timing and air/fuel ratio. The process may be open loop or closed loop. The ECU stores the information it receives and processes in two types of memory, erasable read only memory (ROM) and non-erasable random access memory (RAM).

The engine initially operates open loop until the engine attains a certain operating temperature, and then closed loop. In general, a closed loop strategy is an iterative process whereby the system's output is used as a factor of the input for the next iteration. First, the parameters to be controlled are initialized to predetermined values and inputs are received based on current conditions (the previous iteration's output); secondly the information is processed; and finally an output is produced. The output information is then available as feedback to make adjustments to input parameters on the next iteration of the sequence of steps. Through this technique, a system is able to "learn" from the monitored parameters information about the environment it is operating within and make necessary adjustments. An open loop system eliminates the feedback loop.

In a flexible fuel engine, the ECU receives input from a fuel composition sensor. The fuel composition sensor may be located in or near the fuel tank, and its function is to determine the percentage of alcohol in a gasoline/alcohol fuel mixture. The fuel composition sensor sends an input signal to the ECU that corresponds to the percent alcohol content of the fuel, which is then stored in the ECU's memory as percent alcohol content.

In both typical gasoline-powered engines and flexible fuel engines, another input to the ECU is from the oxygen sensor. The oxygen sensor is located in the exhaust system and detects the amount of oxygen contained in the exhaust products leaving the engine through the exhaust system. The oxygen sensor then generates an input signal to the ECU based on the measured air/fuel ratio.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidization of the products is called stoichiometric. If the air/fuel ratio is less than stoichiometric, an engine is said to be operating rich, i.e. too much fuel is being burned in proportion to the amount of air to achieve perfect combustion. Likewise, if the air/fuel ratio is greater than stoichiometric, an engine is said to be operating lean, i.e. too much air is being burned in proportion to the amount of fuel to achieve perfect combustion. Alcohol fuels have a higher or leaner air/fuel ratio than gasoline at stoichiometric, so that the engine must be compensated for in the rich direction as the percentage of alcohol in the fuel increases.

The ECU processes the input signals for the various sensors, and it's output signal varies the fuel actuator's pulsewidth (fuel injectors, a common type of fuel actuator, are well known in the art) to adjust the fuel flow rate in an amount necessary to achieve the desired air/fuel ratio.

SUMMARY OF THE INVENTION

The present invention improves the reliability of a flexible fuel engine by providing a method for checking the function of a fuel composition sensor for operation outside a predetermined range due to a short or open circuit, and providing a method for determining the percent alcohol content of a fuel by identifying changes in air/fuel control due to a changing mixture of fuel. As a result, engine operation is able to continue uninterrupted.

The preferred embodiment of the subject invention achieves the desired objects by first executing a diagnostic method for determining whether the fuel composition sensor is functioning properly. This may include, but is not limited to comparing the output signal from the fuel composition sensor to a predetermined range, in this example a voltage, stored in the ECU. If the output signal is outside this predetermined range, then the ECU begins to execute a method for learning the percent alcohol content of the fuel.

The method for learning the percent alcohol content of the fuel begins by setting the percent alcohol content memory location, which may be called PRMETH, in the ECU to the last known value that was within the predetermined range, for use in other calculations until altered by the method. Also, other parameters may be set to predetermined stored values at this time, including but not limited to signals that activate an engine speed limiter if a predetermined engine speed is exceeded, disable any purge activity, and set adaptive memory locations to predetermined values. The learning begins by checking the oxygen sensor output signal to determine if the engine is operating too rich or too lean. If the engine is too rich, the value of PRMETH is changed accordingly. If the engine is too lean, the value of PRMETH is also changed accordingly.

It is an object of the invention to provide a diagnostic method for identifying when the fuel composition sensor is operating outside a predetermined range.

It is a further object of the invention to continue uninterrupted engine operation if the fuel composition sensor is operating outside a predetermined range.

It is still another object of the invention to provide method for learning the percent alcohol content of the fuel utilizing output from the oxygen sensor.

Other objects, features and advantages of the present invention will become more fully apparent from the following Description of the Preferred Embodiments, the claims and the accompanying drawings in which:

DESCRIPTION OF THE PREFERRED EMBODIMENTS

An internal combustion engine in a vehicle is able to operate on gasoline or an alcohol fuel or any combination of these fuels when there exists a means for sensing the relative mixture of the fuel in the fuel tank, such as with a fuel composition sensor. The subject invention is a diagnostic method for checking the function of the fuel composition sensor for operation outside a predetermined range due to a short or open circuit condition and a closed loop method for learning the percent alcohol content of the fuel utilizing oxygen sensor data.

Figure 1:
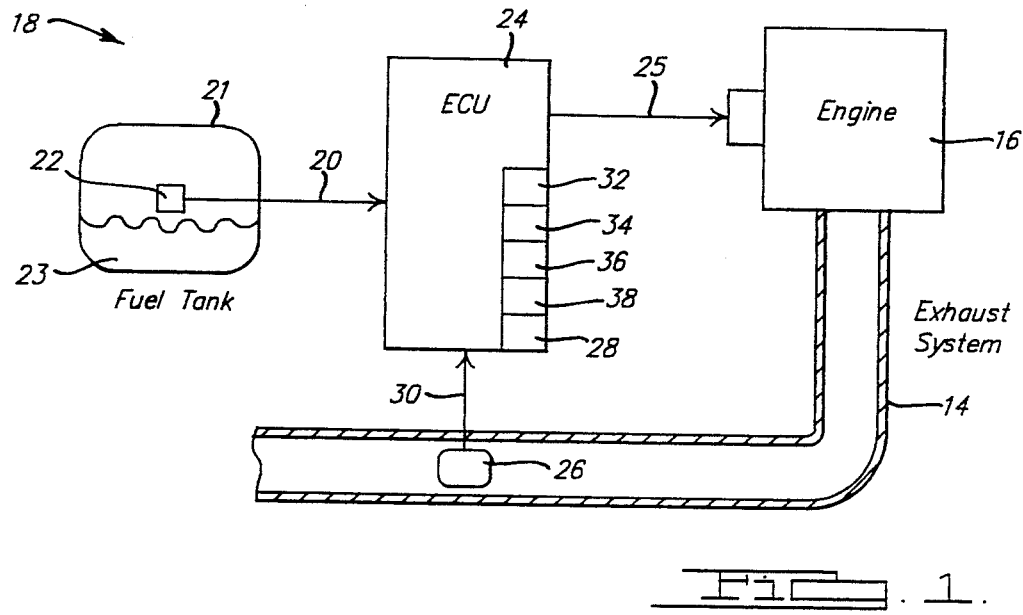
FIG. 1 is a functional block diagram showing a fuel composition sensor and how it is interconnected to control circuitry and hardware related to an engine in a vehicle.

Referring to FIG. 1, a system 18 for determining the percentage of alcohol in a fuel and making the appropriate engine adjustments are schematically shown. The fuel tank 21 of a flexible fuel vehicle contains fuel 23, which can be gasoline, methanol or any combination of the two fuels. Ethanol may also be used in any combination with gasoline. Located within the tank 21 is a fuel composition sensor 22. It is contemplated that sensor 22 could also be located within the fuel delivery system comprising of fuel lines and fuel rail (not shown), of a conventional internal combustion engine 16. The purpose of the fuel composition sensor 22 is to detect the percentage of alcohol of the fuel 23 within the tank 21 and relay an output signal 20 containing the information to an engine control unit (ECU) 24 for processing.

The output signal 20 from the fuel composition sensor 22 contains a voltage representing the percentage of alcohol in the fuel 23. In the ECU 24, the information from the fuel composition sensor output signal 20 is stored as percent alcohol content (PRMETH) 28. In the preferred embodiment, the value contained in PRMETH 28 ranges from 0, indicating 0 percent alcohol, to 85, representing 85 percent alcohol. It is anticipated that the fuel industry will blend alcohol fuels with gasoline in the ratio of 85% alcohol fuel to 15% gasoline in order to improve the cold start-ability of the engine; however, the fuel industry could provide a different ratio, in which case appropriate modifications may be made to the upper value of PRMETH. The ECU 24 uses PRMETH 28 to update appropriate sections of the operating characteristics of the engine 16 in response to and correlated with the concentration of alcohol in the fuel 23.

The ECU 24 processes information from a number of sensors, including an oxygen sensor 26. The oxygen sensor output signal 30 provides the ECU 24 with information regarding how close to stoichiometric the engine 16 is operating. The ECU 24 then sends an output signal 25 to the engine 16 varying the fuel injector's (not shown but well known in the art) pulsewidth to adjust the delivery of fuel 23 from the fuel injectors into the engine 16 in an amount necessary to achieve the predetermined air/fuel ratio.

Figure 2:
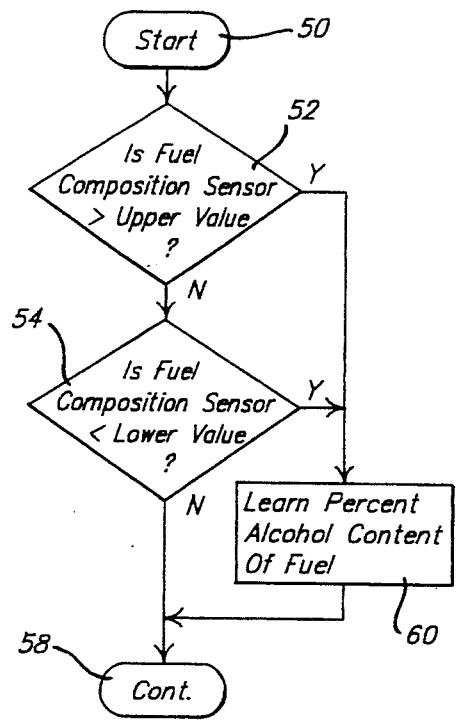
FIG. 2 is a flow chart illustrating a diagnostic method for checking the function of the fuel composition sensor.

FIG. 2 is an overall flowchart showing a diagnostic method for determining whether the fuel composition sensor 22 is functioning within a predetermined range.

The ECU 24 calls for the diagnostic method on a time dependant basis while the engine 16 is operational. The method begins in block 50 and falls through to decision block 52, where it is determined whether signal 20 is greater than a predetermined upper value UPLIM 32 stored in the ECU 24. If signal 20 is greater than UPLIM 32, then signal 20 is out of range and the method branches to block 60 where the learning method of FIG. 3 is used in place of the fuel composition sensor 22 to update PRMETH 28.

Returning to decision block 52, if signal 20 is less than or equal to UPLIM 32, then the diagnostic method proceeds to decision block 54, where signal 20 is compared to a predetermined lower value LOWLIM 34. If signal 20 is less than the LOWLIM 34, the signal 20 is out of range and the method branches to block 60 where the learning method of FIG. 3 is used in place of signal 20 to update PRMETH 28.

Returning to decision block 54, if signal 20 is greater than or equal to the LOWLIM 34, the ECU 24 proceeds to decision block 58 where control is returned back to the ECU 24 and the ECU 24 is free to execute other tasks.

Figure 3:
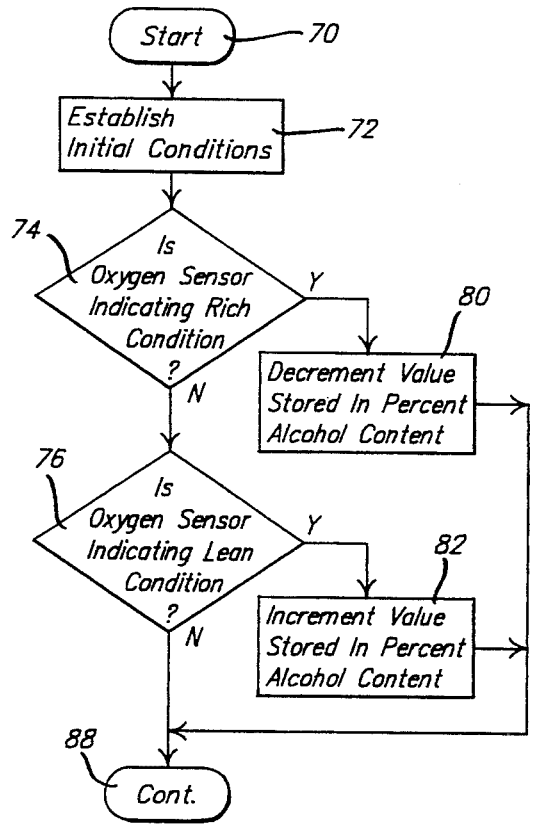
FIG. 3 is a flow chart illustrating a method for learning the percent alcohol content of a fuel utilizing oxygen sensor data.

Returning to decision block 60, the ECU 24 branches to a learning method beginning in Block 70 of FIG. 3 for learning the percent alcohol content of the fuel 23.

The ECU begins the method in Block 70 after being called for by Block 60 of FIG. 2 after determining that the fuel composition sensor 22 is not operating within a predetermined range and continues to Block 72. Initial conditions are established in Block 72, which may include but are not limited to using the last value of PRMETH 28 obtained when the output signal 20 was equal to or between the predetermined upper and lower values UPLIM 32 and LOWLIM 34 in ongoing calculations in the ECU 24 until later changed by this method. Engine 16 speed may also be restricted if a predetermined rpm level is exceeded, for example 3000 rpm. Purge activity (not shown), which is the discharge of fuel vapors stored in a special canister, may also be disabled. Adaptive memory (also known in the art as adaptive learning) locations 36 in the ECU 24 may be set to nominal values. Adaptive memories 36 are closed loop systems widely known in the automotive industry. Adaptive memories 36 are initialized in the RAM memory area (not shown, but well known in the art) of the ECU 24 with preset values for certain parameters related to the operation of the engine 16. These stored parameters are continuously updated and adjusted while the engine 16 is operating, and can be "looked up" and used by the ECU 24 when the engine 16 encounters similar operating conditions. Purge-free adaptive memory locations 38 in the ECU 24 may also be set to predetermined values. Purge-free adaptive memory 38 has a similar function as adaptive memory 36, except that the stored values are updated when the purge solenoid (not shown) is shut off.

Proceeding to decision block 74, the oxygen sensor output signal 30 is compared to a stoichiometric air/fuel ratio of 14.7. If oxygen sensor output signal 30 is less than stoichiometric, a rich air/fuel ratio is indicated, and the method proceeds to block 80 where PRMETH 28 is compensated for in the direction of lean engine 16 operation. In the preferred embodiment, the value stored in PRMETH 28 would be decremented. The method proceeds to block 88.

Returning to decision block 74, if the oxygen sensor output signal 30 is not indicating a rich condition, the method proceeds to decision block 76. In block 76 the oxygen sensor output signal 30 is compared to a stoichiometric air/fuel ratio of 14.7. If greater than stoichiometric, a lean air/fuel is indicated, and the method proceeds to block 82, where PRMETH 28 stored in the ECU 24 is compensated for in the direction of rich engine 16 operation. In the preferred embodiment, the value stored in PRMETH 28 would be incremented. The method proceeds to block 88 where the ECU 24 is free to execute other tasks.

Returning to decision block 76, if the oxygen sensor output signal 30 is not indicating a lean condition, the method proceeds to block 88.

In block 88, the ECU 24 is released to execute other tasks.

It should be understood that while this invention has been discussed in connection with one particular example, those skilled in the art will appreciate that other modifications can be made without departing from the spirit of this invention after studying the specification, drawings, and the following claims.

We claim:

1. In a motor vehicle having an internal combustion engine capable of operation on gasoline and alcohol fuels, having a means for restricting engine speed; a means for purging fuel vapors; a fuel control system working in conjunction with an engine control unit (ECU) with a memory, microprocessing unit and an input/output (I/O) module, an adaptive memory feature and a purge-free adaptive memory feature; a fuel actuator; an oxygen sensor having an input and an output; and a fuel composition sensor having an input and an output signal; a diagnostic method for checking the function of the fuel composition sensor and for learning a value of percent alcohol content of a fuel for selectively controlling combustion parameters of an internal combustion engine utilizing oxygen sensor data, the method comprising:

comparing a fuel composition sensor output signal to a predetermined range of values having an upper and lower limit stored in the ECU;

learning a percent alcohol content of the fuel if the fuel composition sensor output signal is outside the predetermined range which includes:

establishing initial conditions including setting the adaptive memory value to a predetermined nominal value and setting the purge free adaptive memory value to a predetermined nominal value;

determining whether an oxygen sensor output signal is indicating that an engine is operating too rich or lean by comparing an oxygen sensor output signal to stoichiometric, if the fuel composition sensor output signal is not within the predetermined range;

modifying a value of percent alcohol content stored in the ECU in the direction of lean engine operation, if the engine is operating too rich;

modifying the value of percent alcohol content in the direction of rich engine operation, if the engine is operating too lean;

ending said method; and ending said method, if the fuel composition sensor output signal is within the predetermined range.

2. A method for learning percent alcohol content of a fuel as recited in claim 1, wherein the step of establishing initial conditions includes:

continuing to use a last value of percent alcohol content obtained while said fuel composition sensor output signal was within said upper and lower limit until changed by said method.

3. In a motor vehicle having an internal combustion engine capable of operation on gasoline and alcohol fuels, having a means for restricting engine speed; a means for purging fuel vapors; a fuel control system working in conjunction with an engine control unit (ECU) with a memory, microprocessing unit and an input/output (I/O) module, an adaptive memory feature and a purge-free adaptive memory feature; a fuel actuator; an oxygen sensor having an input and an output; and a fuel composition sensor having an input and an output signal; a diagnostic method for checking the function of the fuel composition sensor and for learning a value of percent alcohol content of a fuel for selectively controlling combustion parameters of an internal combustion engine utilizing oxygen sensor data, the method comprising:

comparing said fuel composition sensor output signal to a predetermined range of values having an upper and lower limit stored in the ECU;

learning said percent alcohol content of said fuel if said fuel composition sensor output signal exceeds said upper and lower limit;

establishing initial conditions including activating a means for restricting engine speed, if engine speed exceeds a predetermined level;

determining whether an oxygen sensor output signal is indicating that an engine is operating too rich or lean by comparing said oxygen sensor output signal to stoichiometric, if said fuel composition sensor output signal is not within said predetermined range;

modifying a value of percent alcohol content stored in the ECU in the direction of lean engine operation, if the engine is operating too rich;

modifying said value of percent alcohol content in the direction of rich engine operation, if the engine is operating too lean;

ending said method; and ending said method, if said fuel composition sensor output signal is within said predetermined range.

4. In a motor vehicle having an internal combustion engine capable of operation on gasoline and alcohol fuels, having a means for restricting engine speed; a means for purging fuel vapors; a fuel control system working in conjunction with an engine control unit (ECU) with a memory, microprocessing unit and an input/output (I/O) module, an adaptive memory feature and a purge-free adaptive memory feature; a fuel actuator; an oxygen sensor having an input and an output; and a fuel composition sensor having an input and an output signal; a diagnostic method for checking the function of the fuel composition sensor and for learning a value of percent alcohol content of a fuel for selectively controlling combustion parameters of an internal combustion engine utilizing oxygen sensor data, the method comprising:

comparing said fuel composition sensor output signal to a predetermined range of values having an upper and lower limit stored in the ECU;

learning said percent alcohol content of said fuel if said fuel composition sensor output signal exceeds said upper and lower limit;

establishing initial conditions including disabling the purge activity;

setting the adaptive memory value to a predetermined nominal value; and setting the purge free adaptive memory value to a predetermined nominal value;

determining whether an oxygen sensor output signal is indicating that an engine is operating too rich or lean by comparing said oxygen sensor output signal to stoichiometric, if said fuel composition sensor output signal is not within said predetermined range;

modifying a value of percent alcohol content stored in the ECU in the direction of lean engine operation, if the engine is operating too rich;

modifying said value of percent alcohol content in the direction of rich engine operation, if the engine is operating too lean;

ending said method; and ending said method, if said fuel composition sensor output signal is within said predetermined range.

5. In a motor vehicle having an internal combustion engine with a means for controlling engine speed; a means for purging fuel vapors; a fuel control system working in conjunction with an engine control unit (ECU) with a memory, microprocessing unit and an input/output (I/O) module, an adaptive memory feature and a purge-free adaptive memory feature; a fuel actuator; an oxygen sensor having an input and an output; and a fuel composition sensor having an input and an output; a diagnostic method for checking the function of the fuel composition sensor and for learning a value of percent alcohol content of a fuel for selectively controlling combustion parameters of an internal combustion engine utilizing oxygen sensor data, the method comprising:

comparing a fuel composition sensor output signal to a predetermined range of values having an upper and lower limit stored in the ECU;

learning said percent alcohol content of said fuel, if said fuel composition sensor output signal exceeds said predetermined upper and lower limit;

using the last value of percent alcohol content stored in the ECU obtained while said fuel composition sensor output signal was within said upper and lower limit until changed by said method; activating an engine speed limiter, if engine speed exceeds a predetermined level;

disabling the purge activity;

setting the adaptive memory value to a predetermined nominal value;

setting the purge-free adaptive memory value to a predetermined nominal value;

comparing the oxygen sensor output signal to stoichiometric;

modifying said value of percent alcohol content in the direction of lean engine operation, if the engine is operating too rich;

modifying said value of percent alcohol content in the direction of rich engine operation, if the engine is operating too lean;

ending said method; and ending said method, if said fuel composition sensor output signal is within said upper and lower limit.

* * * * *